Figure 1:
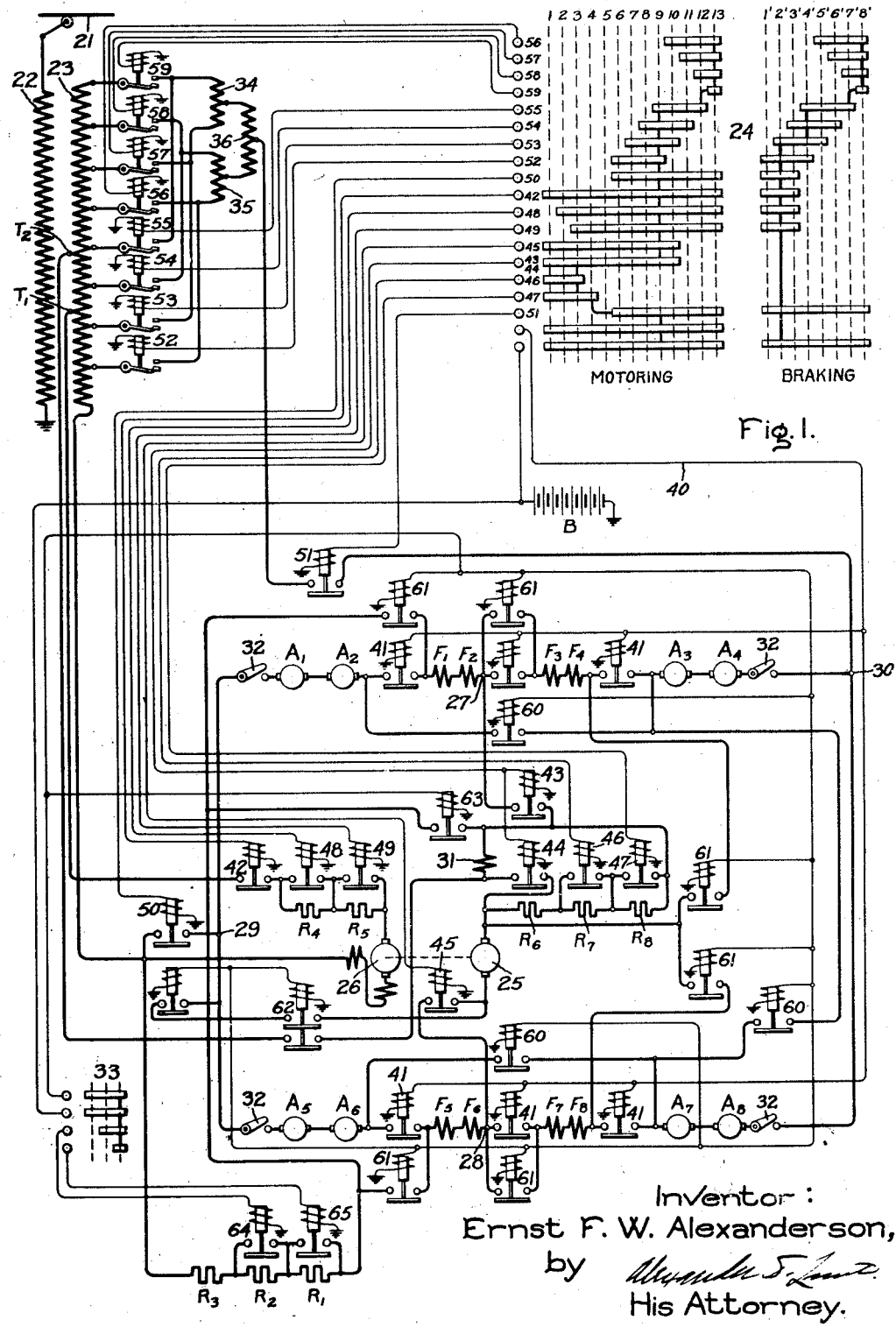

Oct. 12, 1926.

E. F. W. ALEXANDERSON 1,603,102

ALTERNATING CURRENT MOTOR CONTROL

Filed March 29, 1926    2 Sheets-Sheet 1

Inventor:
Ernst F. W. Alexanderson,
by
His Attorney.

Oct. 12, 1926.

E. F. W. ALEXANDERSON 1,603,102

ALTERNATING CURRENT MOTOR CONTROL

Filed March 29, 1926    2 Sheets-Sheet 2

Inventor:
Ernst F. W. Alexanderson,
by
His Attorney.

Patented Oct. 12, 1926.

1,603,102

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ALTERNATING-CURRENT-MOTOR CONTROL.

Application filed March 29, 1926. Serial No. 98,135.

The present invention provides an improved method and means for operating electric motors either as direct and alternating current motors or as alternating current regenerative braking generators and the invention is particularly applicable to electric railway locomotives having a plurality of driving motors of the series commutator type.

In my prior Patent, No. 1,563,004 of November 24, 1925, I have described and claimed a control arrangement for alternating current series commutator motors in which the motors are supplied with direct current for starting before being energized with the alternating current. A separate exciter consisting of a direct current series generator is employed for supplying the starting current to the alternating current series commutator motors. In railway service the separate exciter is mounted upon the electric locomotive and driven by a suitable alternating current motor.

By means of the present invention the separate exciter also may be employed to supply alternating current excitation to the field windings of the series commutator motors to obtain regenerative braking operation. Furthermore, the improvements provided by the present invention insure a stable speed torque characteristic when the motors are operated as alternating current braking generators and also enable a stable phase chracteristic of the alternating current regenerative braking circuit to be obtained. This results in a flexible and efficient alternating current motor control equipment that is specially well suited for railway service.

In alternating current regenerative braking operation, as well as in direct current braking operation, it is desirable that the characteristics of the braking equipment should have the composite characteristics of a shunt generator and a series motor. With such equipment the shunt generator characteristic produces the regenerative energy and the series motor characteristic stabilizes the speed torque characteristic of the regenerating machines, as well as the phase characteristics of the regenerative braking circuit. This is accomplished in accordance with my present invention by exciting the field of the exciter generator with alternating current and connecting the exciter armature to separately excite the field windings of the alternating current braking generators. Furthermore, an additional component of excitation varying in accordance with both the phase and the value of the regenerated alternating braking current is impressed upon the field winding of the exciter generator, in order to automatically vary the excitation of the series commutator alternating current motors and thereby produce stable regenerative braking operation.

The invention may be more fully understood by reference to the accompanying drawings which diagrammatically illustrate the invention embodied in a preferred form of multiple motor control system intended for electric locomotive service.

Figure 2:
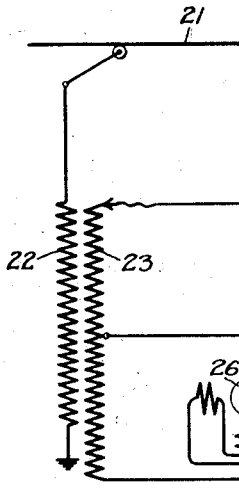

Fig. 1 is a general schematic diagram of the driving motor and exciter circuits, together with the switch mechanism, comprising the locomotive control arrangement; Fig. 2 is a simple circuit diagram of the motoring connections; and Fig. 3 is a similar diagram of the regenerative braking connections.

In Fig. 1 of the drawing the driving motors of the locomotive are shown as of the series commutator type having the armatures $A_1$ to $A_8$ and the corresponding field windings $F_1$ to $F_8$, although the motors may be provided with suitable compensating windings if desired. Power is supplied to the several driving motors from the alternating current supply line 21 through a transformer having the primary winding 22 and the secondary winding 23, and the manually operated controller 24 serves to establish and regulate the motoring connections through the agency of the several electromagnetic contactors controlled thereby. The controller 24, in conjunction with the braking controller 33, also is arranged to control the connection of the motors for regenerative braking operation.

To enable the locomotive driving motors to be started with direct current as disclosed in my prior patent, the separate exciter 25 driven by the series alternating current motor 26 is arranged to be connected to the points 27 and 28 in the motor circuit to supply the starting current. The secondary winding 23 of the transformer subsequently is connected to the points 29 and 30 to supply alternating current for normal running operation. The main motoring circuits are shown in simplified form in Fig. 2. During starting, the field winding 31 of the separate exciter 25 is connected directly in series with the armature of the exciter to form a series direct current generator.

Figure 3:
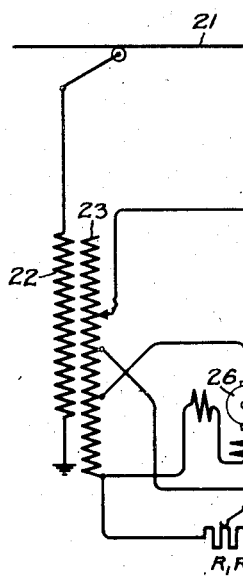

For regenerative braking operation the field windings $F_1$ to $F_8$ of the motors are arranged to be separately excited from the exciter 25 and the exciter field winding 31 is separately excited from a portion of the secondary winding 23 of the transformer with the resistors $R_1$, $R_2$, $R_3$, in the exciting circuit of the field winding, as illustrated in the simplified connection diagram of Fig. 3. The resistors $R_1$, $R_2$, $R_3$, also are connected in the regenerative braking circuit so that the voltage drop therein is dependent upon both the phase and the value of the regenerated current.

The operation of the control system is as follows: To initiate motoring operation the several disconnecting switches 32 are closed and the controller 24 is advanced into position 1. This energizes the electromagnetic contactors 41 from the battery B through the control conductor 40 and serves to interconnect the armatures and field windings of the several driving motors in a closed circuit. At the same time, the contactor 42 is closed to connect the alternating current motor 26 across a suitable portion $T_1$ of the secondary winding 23 of the transformer and thereby start the separate exciter 25 into operation.

In the first position of the controller 24 the contactors 43 and 44 are closed to connect the exciter field winding 31 directly in series with the armature of the exciter and in shunt with the regulating resistors $R_6$, $R_7$, $R_8$. Contactor 45 also is closed to complete the connections through the exciter 25 between the points 27 and 28 in the motor circuit. Thereupon the exciter 25 builds up as a series direct current generator and supplies the large value of direct current required to start the driving motors $A_1$ to $A_8$. At starting, the contactors 46 and 47 are closed to short circuit the resistors $R_7$, $R_8$ in the shunt circuit around the exciter field winding 31 in order to limit the exciter voltage. As the controller is advanced to the 3rd position, the contactors 48 and 49 controlling the resistors $R_4$ and $R_5$ in the circuit of driving motor 26, are successively closed to increase the speed of the driving motor 26 and thereby increase the voltage of the direct current supplied to the motors $A_1$ to $A_8$ from the exciter 25. In the fourth and fifth positions of controller 24 the contactors 46 and 47 are deenergized to increase the excitation of the exciter field winding 31 so as to further increase the voltage at which the direct current is supplied to the motors $A_1$ to $A_8$, and thereby further accelerate the driving motors.

In position 6 the controller 24 establishes the energizing circuits for the contactors 50, 51, 52 to connect the low voltage portion $T_2$ of the transformer secondary winding 23 to the equipotential points 29 and 30 of the motor circuit, thus impressing alternating current upon the driving motors $A_1$ to $A_8$ while the motors are still supplied with direct current from the exciter 25.

In the succeeding positions of the controller 24 the electromagnetic switches 53, 54, 55, 56, 57, 58 and 59 are successively closed to increase the voltage of the alternating current supplied through the transition reactors 34, 35 and 36 to the motors $A_1$ to $A_8$. After the 10th position, the electromagnetic contactors 43 to 47 are deenergized to disconnect the separate exciter 25 from the motor circuit.

The operation of the control system shown in Fig. 1 to start and accelerate the motors for motoring operation is substantially the same as that of the motor control system of my prior Patent No. 1,563,004, wherein the various practical advantages of starting the alternating current motors with direct current are fully set forth. The operation of the control system to obtain regenerative braking operation of the alternating current motors in accordance with my present invention is as follows:

With the motors operating in any of the motoring positions of the controller 24 or with the motors unenergized, regenerative braking operation may be initiated by advancing the controller 24 into the first braking position and, at the same time, operating the braking controller 33 into its first operative position.

In the first braking position of controller 24 energizing circuits from the battery B are established for the electromagnetic switches 42, 48, 49, 50, 51, and 52, and in the first operative position of the braking controller 33 an energizing circuit is established for the several electromagnetic switches 60 and 61. Energization of switches 42, 48 and 49 continues the operation of exciter 25 at full speed by the driving motor 26. The closure of switches 50, 51 and 52, together with the closure of the switches 60, serves to connect the armatures $A_1$ to $A_8$ of the motors in circuit with the low voltage portion of the secondary winding 23 of the transformer. At the same time the switches 61 are closed to connect the motor field windings $F_1$ to $F_8$ in parallel series circuits with the armature of the exciter 25, as indicated in Fig. 3.

Furthermore, the electromagnetic switches 62 and 63 are closed to connect the exciter field winding 31 to be energized responsively to the voltage across a portion $T_2$ of the transformer secondary winding and also the voltage drop across the resistors $R_1$, $R_2$, $R_3$ due to the regenerated current of the motors. In this way the exciter field winding 31 is supplied with an alternating current energization having one component in accordance with the voltage of the alternating current source 21 and an additional component in accordance with the regenerated current of the motors. The portion $T_2$ of the transformer secondary winding 23 supplies an alternating current shunt excitation to the exciter field winding 31 which causes the armature of the exciter 25 to supply an alternating current excitation to the field windings $F_1$ to $F_8$ of the corresponding motors. The alternating current shunt excitation of the motor field windings causes the motor armatures to generate alternating current which flows through a portion of the transformer secondary windings and thereby returns energy to the power source 21. As the regenerated current flows through the resistors $R_1$, $R_2$, $R_3$, the additional component of energization supplied to the exciter field winding 31 by the voltage drop across these resistors is of the correct phase relation to stabilize the speed torque characteristics of the motors, as well as the phase characteristics of the regenerative braking circuit. This is due to the fact that an energy current flowing from the motor armatures to the transformer will produce a voltage drop in the resistance which is in phase with the regenerated current. This voltage drop in its turn will produce a current in the exciter field 31, which is substantially 90° out of phase with the motor current due to the inductive character of the motor field circuit. The resulting armature voltage of the exciter likewise is substantially 90° out of phase with the regenerated current of the motors and this voltage in its turn produces an exciting current in the motor field windings $F_1$ to $F_8$ which is substantially 90° out of phase with the exciter voltage and, consequently, in the proper phase relation for regenerative braking operation of the motors. The additional component of excitation supplied by the voltage drop across the resistors $R_1$, $R_2$, $R_3$, is differential with respect to the exciter excitation derived from the transformer so long as the regenerated current of the motors is in phase with the transformer voltage. Hence, should the speed of the motors tend to increase, the increase in regenerated current would correspondingly decrease the excitation of exciter 25 and thereby decrease the excitation of the motors so as to produce the required braking effect at the higher speed.

The component of excitation to the exciter field winding 31 furnished by the voltage drop across the resistors $R_1$, $R_3$, also automatically stabilizes the phase characteristics of the regenerative braking circuit. Thus, in case a wattless current flows in the braking circuit, a voltage out of phase with the alternating current power voltage is impressed upon the exciter field winding 31 and this out of phase voltage serves to alter the exciter voltage and, consequently, the excitation of the motor field winding is in such manner that a voltage is induced in the motor armatures in a direction which tends to neutralize the tendency for the wattless current to circulate in the regenerated braking circuit.

By operating the controller 24 through its successive braking positions the connection of the motor armatures to the transformer secondary winding 23 may be shifted to include any desired portion of the transformer secondary winding through the operation of the electromagnetic switches 52 to 58 inclusive in substantially the same manner as described in connection with the motoring operation of the motors. The operation of the braking controller 33 through its successive positions serves to successively energize the electromagnetic switches 64 and 65, thereby short circuiting the resistors $R_2$ and $R_1$ to control the value of the series component of excitation of the exciter field winding 31. In this way the regenerative braking effect of the motors may be easily controlled to meet any operating condition encountered.

From the foregoing it will be seen that the present invention provides a control system which facilitates starting the alternating current motors by supplying direct current thereto and, at the same time, permits regenerative braking to be obtained by exciting the field windings of the motors through the agency of the same exciter used in starting motoring operation. Furthermore, by inducing the series component of excitation into the exciter field winding 31, the armature of the exciter need carry only the field excitation current of the motors.

While I have illustrated the invention embodied in a preferred form of control system for a plurality of motors, it will be understood that the arrangement shown may be modified considerably without departing from the spirit and scope of the invention.

What I claim as new and desire to secure by Letters Patent of the United States, is:—

1. In combination, a series commutator motor, an exciter, switch mechanism for connecting the motor to the exciter for direct current starting and to an alternating current source for alternating current motoring operation, and means for controlling the exciter to supply alternating current excitation to the motor for alternating current regenerative braking operation.

2. The combination with a series commutator alternating current motor and switch mechanism for connecting the motor to a source of supply for motoring and regenerative braking operation, of a commutator dynamo electric machine and switch mechanism for connecting the machine to supply direct current for starting the motor during motoring operation and for supplying alternating current to the field winding of the motor during regenerative braking operation.

3. In combination, a series commutator motor and switch mechanism for connecting the motor to an alternating current source for both motoring and regenerative braking operation, a commutator exciter for supplying direct current to the motor for starting motoring operation, and means for energizing the exciter from the alternating current source to supply alternating current excitation to the motor for alternating current regenerative braking operation.

4. In combination, a series commutator motor, switch mechanism for connecting the motor to an alternating current source for both motoring and regenerative braking operation, an exciter having armature and field windings, switch mechanism for interconnecting the armature and field windings of the exciter to supply direct current to the series motor during motoring operation, and means for separately energizing the field winding of the exciter from the alternating current source and connecting the armature of the exciter to supply alternating current excitation to the motor during regenerative braking operation.

5. The combination with an alternating current commutator motor and switch mechanism for connecting the motor to an alternating current source for regenerative braking operation, of means including an alternating current commutator generator for exciting the field windings of the motor with a current varying in phase and amount in accordance with the regenerated current of the motor.

6. The combination of an alternating current commutator motor and an alternating current commutating generator for supplying excitation to the field windings of the motor to effect regenerative braking operation thereof, and means for supplying a component of excitation to the field winding of the generator varying in phase and amount in accordance with the regenerated current of the motor.

7. In combination, a series commutator motor and switch mechanism for connecting the motor armature to an alternating current source, a commutator generator for separately exciting the field winding of the motor for regenerative braking operation thereof, and means for energizing the field winding of the generator jointly in accordance with the voltage of the alternating current source and the regenerated current of the motor.

8. In combination, a series commutator motor and switch mechanism for connecting the motor armature to an alternating current source, a commutator generator for separately exciting the field winding of the motor for regenerative braking operation thereof, and means for energizing the field winding of the generator jointly in accordance with the voltage of the alternating current source and both the phase and value of the regenerated current of the motor.

9. In combination, a series commutator motor and switch mechanism for connecting the motor armature to an alternating current source, a commutator generator for separately exciting the field windings of the motor for regenerative braking operation thereof, means for energizing the field winding of the generator from the A. C. source, and means energized in accordance with the regenerated current of the motor for controlling the energization of the generator field winding to neutralize the flow of wattless current in the regenerative braking circuit.

10. In combination, a series commutator motor and switch mechanism for connecting the motor armature to an alternating current source, a commutator generator for separately exciting the field windings of the motor for regenerative braking operation thereof, means for energizing the field winding of the generator from the A. C. source, a resistance connected in the regenerative braking circuit of the motor and connections for energizing the field winding of the generator in accordance with the voltage drop across said resistance to thereby neutralize the wattless current of the regenerative braking circuit.

11. In combination, a series commutator motor, switch mechanism for connecting the motor to an alternating current source for both motoring and regenerative braking operation, a commutator exciter having armature and field windings arranged to supply direct current to the motor for starting motoring operation, switch mechanism for separately energizing the field winding of the exciter from the alternating current source and connecting the armature of the exciter to supply alternating current excitation to the motor for regenerative braking operation, and means responsive to the regenerated current of the motor for controlling the alternating current energization of the exciter field winding to neutralize the flow of wattless current in the regenerative braking circuit.

In witness whereof, I have hereunto set my hand this 27th day of March, 1926.

ERNST F. W. ALEXANDERSON.